(12) United States Patent
Kehrwald et al.

(10) Patent No.: US 11,900,504 B2
(45) Date of Patent: Feb. 13, 2024

(54) AUGMENTED REALITY EXPERIENCES FOR PHYSICAL PRODUCTS IN A MESSAGING SYSTEM

(71) Applicant: Snap Inc., Santa Monica, CA (US)

(72) Inventors: Erika Michele Kehrwald, Venice, CA (US); Oleksii Kholovchuk, Marina Del Rey, CA (US); Gabriel Lupin, Marina del Rey, CA (US); Trevor Stephenson, Camarillo, CA (US); Artem Yerofieiev, Marina del Rey, CA (US); Jialu Zhao, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/301,087

(22) Filed: Mar. 24, 2021

(65) Prior Publication Data

US 2021/0304453 A1 Sep. 30, 2021

Related U.S. Application Data

(60) Provisional application No. 63/002,956, filed on Mar. 31, 2020.

(51) Int. Cl.
*G06T 11/00* (2006.01)
*G06F 3/04883* (2022.01)
(Continued)

(52) U.S. Cl.
CPC ............ *G06T 11/00* (2013.01); *G06F 3/0482* (2013.01); *G06F 3/04883* (2013.01); *H04L 51/046* (2013.01); *G06T 2200/24* (2013.01)

(58) Field of Classification Search
CPC ... G06T 11/00; G06T 2200/24; G06F 3/0482; G06F 3/04883; H04L 51/046
See application file for complete search history.

(56) References Cited

U.S. PATENT DOCUMENTS 8,195,663 B1 * 6/2012 Hall ..................... G06F 16/951
707/758
8,982,110 B2 3/2015 Saban et al.
(Continued)

FOREIGN PATENT DOCUMENTS

CN 106817394 A * 6/2017 ............. G06F 16/33
CN 115605897 A 1/2023
(Continued)

OTHER PUBLICATIONS

Grohar, Sanja, "How to do a perfect selfie using YouCam Makeup app", published online at https://www.youtube.com/watch?v=gR7t53LucuM&t=324s as of Jul. 22, 2015, video length 14:46, showing YouCam Makeup app (Year: 2015).*
(Continued)

*Primary Examiner* — William A Beutel
(74) *Attorney, Agent, or Firm* — Schwegman Lundberg & Woessner, P.A.

(57) ABSTRACT

The subject technology selects a set of augmented reality content generators from a plurality of available augmented reality content generators, the selected set of augmented reality content generators comprising at least one augmented reality content generator for providing augmented reality content based on a product. The subject technology causes display of a carousel interface comprising selectable graphical items, each selectable graphical item corresponding to a respective augmented reality content generator. The subject technology receives, at a client device, a selection of a first selectable graphical item from the plurality of selectable graphical items. The subject technology applies, to first image data, the first augmented reality content generator corresponding to the selected first selectable graphical item. The subject technology causes a display of second image data, the second image data include including the applied
(Continued)

first augmented reality content generator to the first image data.

21 Claims, 17 Drawing Sheets

(51) Int. Cl.
  *H04L 51/046* (2022.01)
  *G06F 3/0482* (2013.01)

(56) References Cited

U.S. PATENT DOCUMENTS

| | | | |
|---|---|---|---|
| 10,114,885 B1 | 10/2018 | Cheng | |
| 10,147,129 B1 | 12/2018 | Shang et al. | |
| 10,270,983 B1* | 4/2019 | Van Os | H04N 5/2621 |
| 10,430,016 B2 | 10/2019 | Monastyrshyn et al. | |
| 11,069,094 B1* | 7/2021 | Evangelista | A45D 44/005 |
| 11,335,088 B2 | 5/2022 | Anvaripour et al. | |
| 2009/0234716 A1 | 9/2009 | Mallick et al. | |
| 2011/0041086 A1 | 2/2011 | Kim et al. | |
| 2011/0134108 A1* | 6/2011 | Hertenstein | G06T 19/006 |
| | | | 345/419 |
| 2012/0116909 A1* | 5/2012 | Saenz | G06Q 30/08 |
| | | | 705/26.3 |
| 2014/0085333 A1* | 3/2014 | Pugazhendhi | G06F 3/011 |
| | | | 345/633 |
| 2015/0055821 A1 | 2/2015 | Fotland | |
| 2015/0212664 A1* | 7/2015 | Freer | G06Q 30/0256 |
| | | | 705/14.54 |
| 2016/0054889 A1 | 2/2016 | Hadley et al. | |
| 2016/0292926 A1 | 10/2016 | Rosenthal et al. | |
| 2017/0052595 A1 | 2/2017 | Poulos et al. | |
| 2018/0131878 A1 | 5/2018 | Charlton et al. | |
| 2018/0144548 A1* | 5/2018 | Kline | G06F 3/011 |
| 2018/0253901 A1 | 9/2018 | Charlton et al. | |
| 2018/0367484 A1 | 12/2018 | Rodriguez et al. | |
| 2019/0114836 A1 | 4/2019 | Holzer et al. | |
| 2019/0179405 A1* | 6/2019 | Sun | G06F 1/1686 |
| 2019/0302979 A1 | 10/2019 | Klein et al. | |
| 2019/0371046 A1 | 12/2019 | Trousdale et al. | |
| 2020/0020173 A1 | 1/2020 | Sharif | |
| 2020/0150832 A1 | 5/2020 | Winn et al. | |
| 2021/0303855 A1 | 9/2021 | Anvaripour et al. | |
| 2022/0237914 A1 | 7/2022 | Anvaripour et al. | |

FOREIGN PATENT DOCUMENTS

| | | |
|---|---|---|
| CN | 115699062 A | 2/2023 |
| KR | 20160131873 | 11/2016 |
| KR | 20160131873 A | 11/2016 |
| KR | 20170090057 | 8/2017 |
| KR | 20170090057 A | 8/2017 |
| KR | 20180103037 | 9/2018 |
| KR | 20180103037 A | 9/2018 |
| WO | WO-2021202191 A1 | 10/2021 |
| WO | WO-2021203119 A1 | 10/2021 |

OTHER PUBLICATIONS

"International Application Serial No. PCT/US2021/070302, International Search Report dated Jul. 14, 2021", 4 pgs.
"International Application Serial No. PCT/US2021/070302, Written Opinion dated Jul. 14, 2021", 4 pgs.
"U.S. Appl. No. 16/834,343, Corrected Notice of Allowability dated Mar. 11, 2022", 2 pgs.
"U.S. Appl. No. 16/834,343, Final Office Action dated Jul. 2, 2021", 18 pgs.
"U.S. Appl. No. 16/834,343, Non Final Office Action dated Mar. 9, 2021", 15 pgs.
"U.S. Appl. No. 16/834,343, Notice of Allowance dated Apr. 8, 2022", 8 pgs.
"U.S. Appl. No. 16/834,343, Notice of Allowance dated Dec. 15, 2021", 8 pgs.
"U.S. Appl. No. 16/834,343, Response filed May 7, 2021 to Non Final Office Action dated Mar. 9, 2021", 9 pgs.
"U.S. Appl. No. 16/834,343, Response filed Aug. 23, 2021 to Final Office Action dated Jul. 2, 2021", 11 pgs.
"International Application Serial No. PCT/US2021/023863, International Search Report dated Jul. 15, 2021", 5 pgs.
"International Application Serial No. PCT/US2021/023863, Written Opinion dated Jul. 15, 2021", 6 pgs.
"International Application Serial No. PCT/US2021/023863, International Preliminary Report on Patentability dated Oct. 13, 2022", 8 pgs.
"International Application Serial No. PCT/US2021/070302, International Preliminary Report on Patentability dated Oct. 13, 2022", 6 pgs.
"U.S. Appl. No. 17/720,892, Non Final Office Action dated May 25, 2023", 21 pgs.
"U.S. Appl. No. 17/720,892, Response filed Jul. 24, 2023 to Non Final Office Action dated May 25, 2023", 11 pgs.

* cited by examiner

AUGMENTED REALITY EXPERIENCES FOR PHYSICAL PRODUCTS IN A MESSAGING SYSTEM

CLAIM OF PRIORITY

This application claims the benefit of priority to U.S. Provisional Application Ser. No. 63/002,956, filed on Mar. 31, 2020, which is incorporated herein by reference in its entirety for all purposes.

BACKGROUND

This application relates generally to, utilizing electronic devices, providing augmented reality experiences of physical products.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
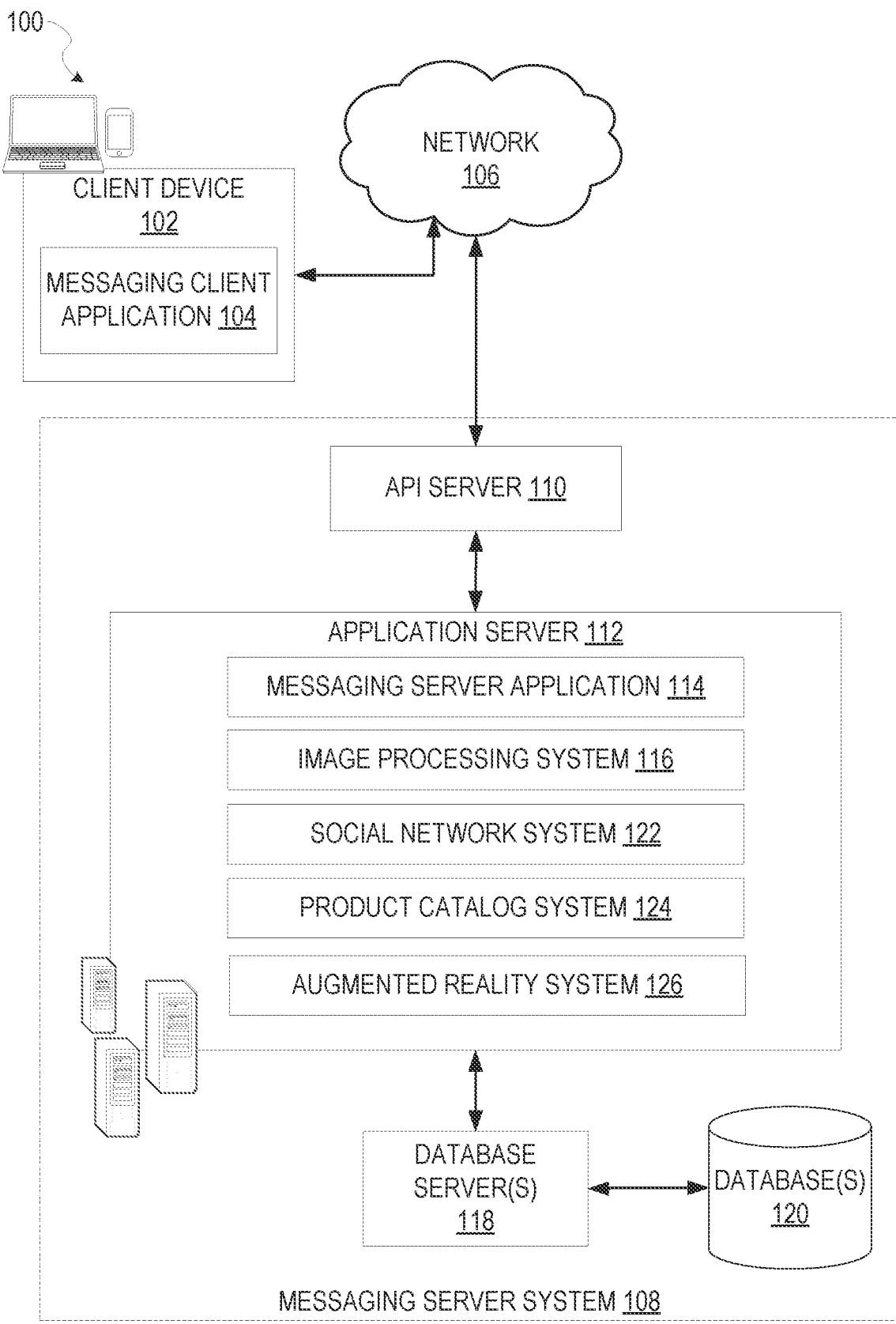
FIG. 1 is a diagrammatic representation of a networked environment in which the present disclosure may be deployed, in accordance with some example embodiments.

With the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, for example the Internet. For enhancing users' experiences with digital images and content using augmented reality, and enabling computing devices to identify various objects or features captured in a wide range of changing conditions (e.g., changes in image scales, noises, lighting, movement, or geometric distortion) can be challenging and computationally intensive. In an aspect, the subject technology provides an improved system for providing augmented reality experiences of products (which can be purchased) that are then applied to such objects (e.g., a user's face) as described further herein.

Messaging systems are frequently utilized, and are increasingly leveraged by users of mobile computing devices, in various settings, to provide different types of functionality in a convenient manner. As described herein, the subject messaging system provides a practical application that enables providing augmented reality experiences for products. The subject messaging system performs a process to access additional information related to a given product based on product metadata, while leveraging the capabilities of the subject message system. The subject messaging system can render an augmented reality (AR) experience(s), in connection with the product, in a scene with an object(s) such as a user's face, along with providing product information, or other information. In an example, the AR experience provides AR content that is applied to the object such as a representation of the user's face for display on a given client device. Such AR content can be related to the product, such as rendering how a beauty product would appear on the representation of the user's face.

Thus, the subject technology is understood to advantageously provide technical improvements in presenting AR content items to facilitate a natural and intuitive presentation of AR content (e.g., without lag and dropping frames due to graphical bottlenecks and inefficient processing of AR content) and thereby increase a sense of presence in an environment including a mixture of (real) physical items and AR content items.

In an example, the technical improvements also involve utilizing server or remote computing resources to process and render AR content, while in yet another example, AR content can be rendered by a given computing device and then propagated to other computing devices for presentation. Through the combination and utilization of various techniques described herein, a latency of displaying AR content items (e.g., a duration of time(s) for the AR content to be generated and subsequently rendered on the respective display of a given device can be reduced), in comparison with other existing implementations, to provide a more immersive and compelling user experience.

As referred to herein, the phrase "augmented reality experience," "augmented reality content item," "augmented reality content generator" includes or refers to various image processing operations corresponding to an image modification, filter, LENSES, media overlay, transformation, and the like, as described further herein.

FIG. 1 is a block diagram showing an example of a messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, a product catalog system 124, and an augmented reality system 126. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
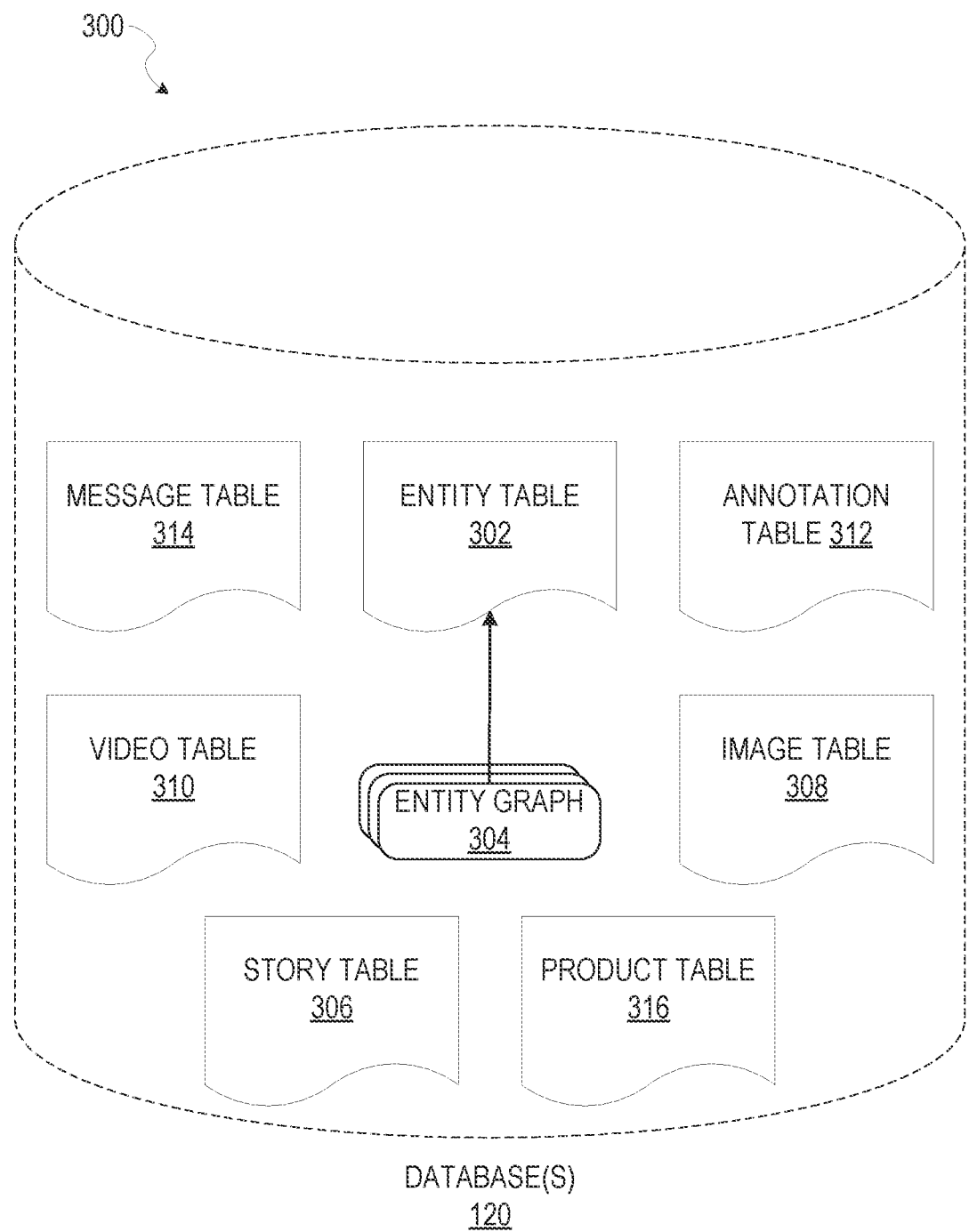
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The messaging client application 104 includes a set of functions that allows the client device 102 to access the augmented reality system 126. The augmented reality system 126 generates and maintains a list of augmented reality content generators. A given augmented reality content generator may correspond to an augmented reality content item (or some other image modification, image processing, transformation, modification, and the like) for supplementing captured image data or video data with augmented reality content in order to provide an augmented reality experience (s).

In one or more embodiments, the augmented reality system 126 identifies an object depicted in the one or more images captured by the messaging client application 104, and determines one or more attributes of the object. The augmented reality system 126 searches for one or more augmented reality content items (e.g., virtual objects) that are associated with the one or more attributes of the object, and ranks the virtual objects (e.g., based on the associations and weights assigned to each of the attributes). The augmented reality system 126 causes one or more virtual objects or graphical elements of the highest ranked augmented reality content item to be presented on top of the captured image.

The application server 112 is communicatively coupled to a database server 118, which facilitates access to a database 120 in which is stored data associated with messages processed by the messaging server application 114.

The product catalog system 124 performs operations for verifying products based at least on image data of such products provided by the messaging client application 104. In an embodiment, the product catalog system 124 may store information (e.g., metadata) related to manufacturers of such products, and information utilized for verifying the authenticity of the products, in the database 120. The product catalog system 124 is discussed in further detail with respect to FIG. 6 below.

Figure 2:
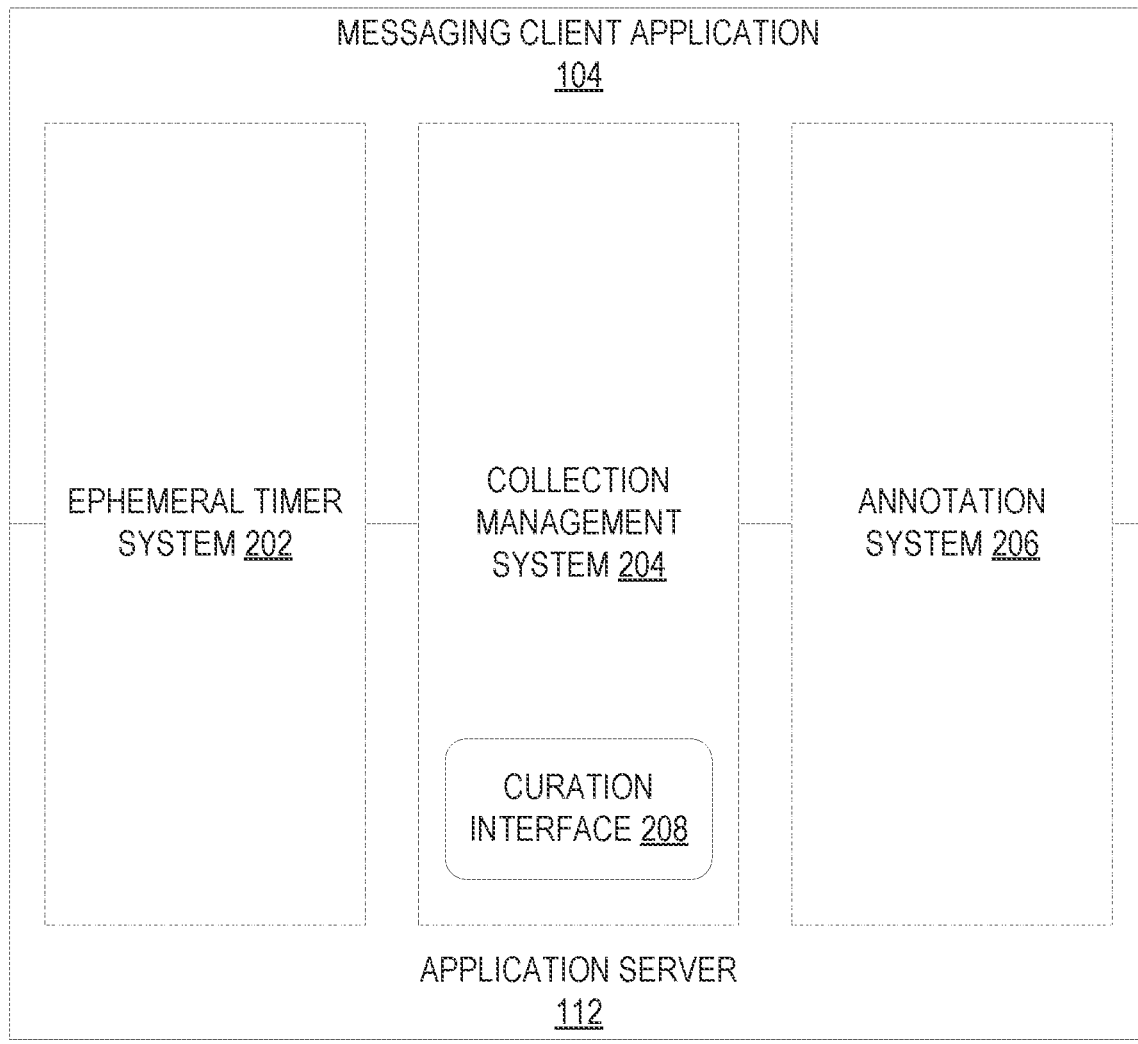
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying LENSES, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 also stores data of products in a product table 316, which enables the product catalog system 124 to perform operations related to providing an augmented reality experience with respect to a product (e.g., a given physical item that may be available for purchase or sale). In an example, the product table 316 includes a directory (e.g., listing) of products and their associated product identifiers, which can be compared against product metadata provided by the product catalog system 124. As described further herein, the product catalog system 124 can determine product metadata associated with a particular product. Such product metadata, as described further below, include a product identifier, which can be utilized as part of a process for providing an augmented reality experience in connection with the product.

Figure 4:
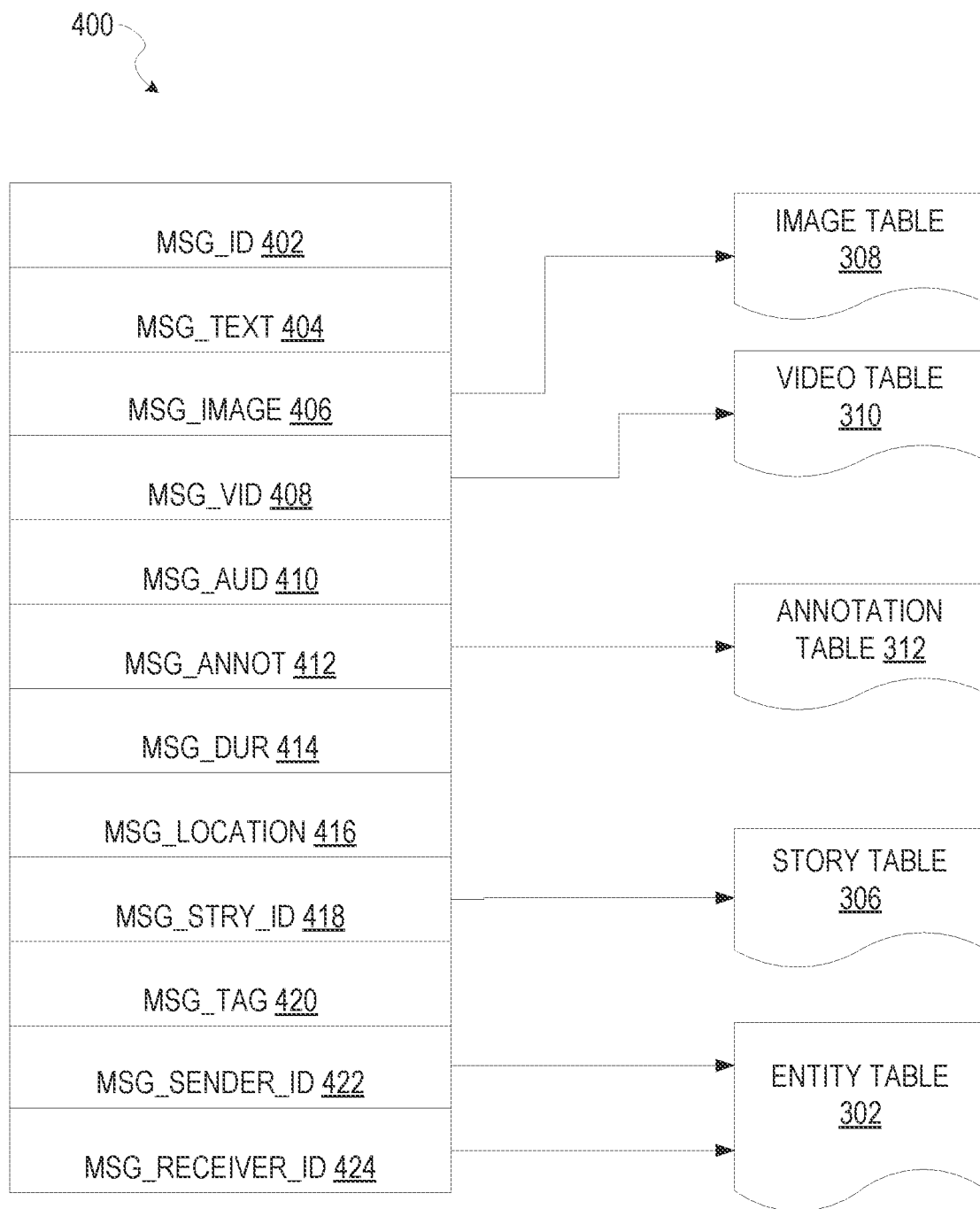
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400. A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
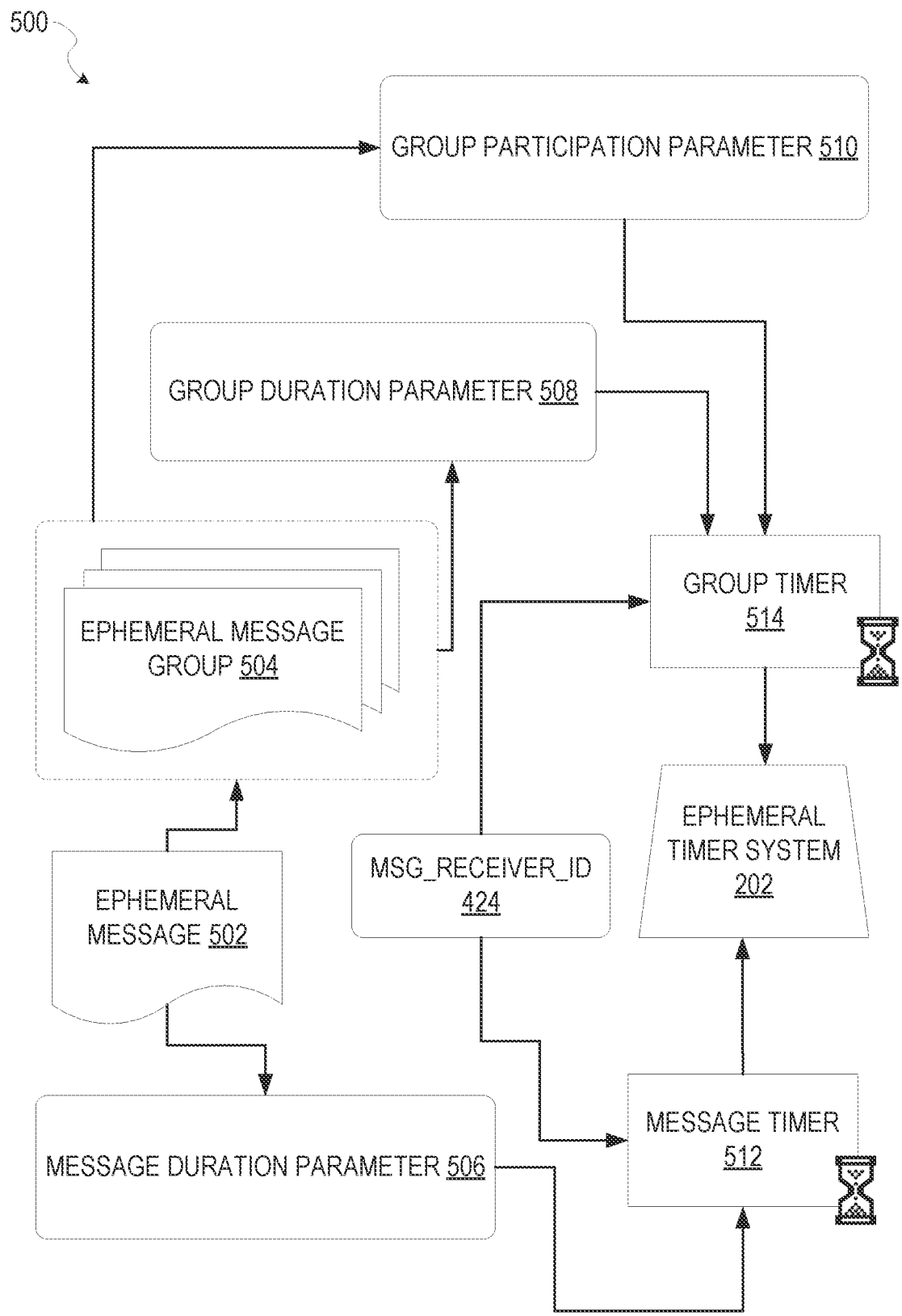
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized implementation of the ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
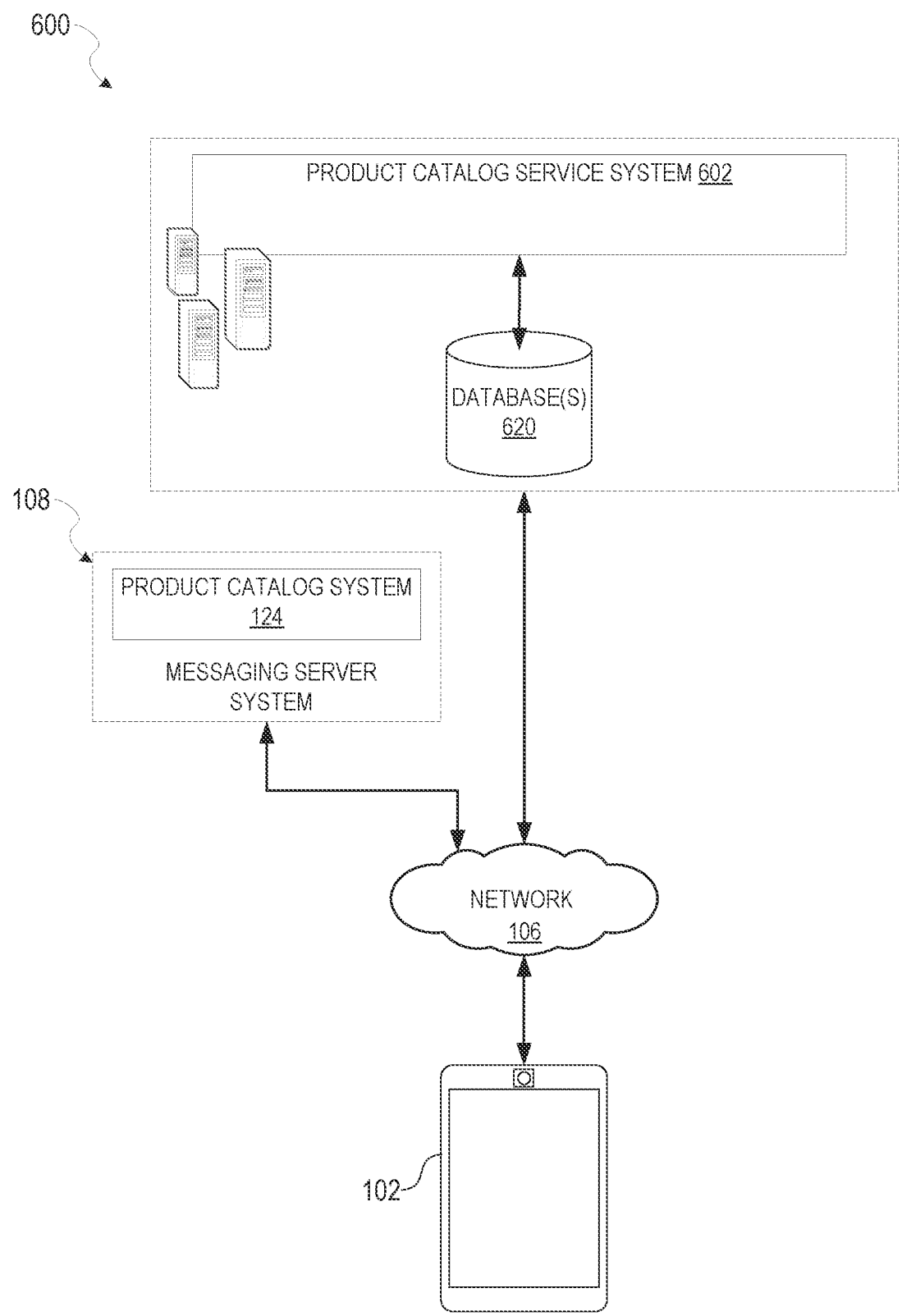
FIG. 6 is a block diagram showing an example network environment for accessing a product catalog service for products (e.g., physical items), including portions of the messaging system discussed above in FIG. 1, according to some example embodiments.

FIG. 6 is a block diagram showing an example network environment 600 for accessing information from a product catalog service for products (e.g., physical items for sale), including portions of the messaging system 100 discussed above in FIG. 1, according to some example embodiments. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As described herein, the client device 102 is configured to select augmented reality content (e.g., corresponding to an augmented reality experience).

For explanatory purposes, the network environment 600 is illustrated in FIG. 6 as including the client device 102, the messaging server system 108, and a product catalog service system 602; however, the network environment 600 may include any number of electronic devices and any number of servers or a data center including multiple servers in some embodiments.

In one or more implementations, the network 106 may be an interconnected network of electronic devices that may include, or may be communicatively coupled to, the Internet. The network 106 may communicatively (directly or indirectly) couple, for example, the client device 102 with the messaging server system 108 or the product catalog service system 602.

The messaging server system 108 or the product catalog service system 602 may be part of a network of computers or a group of servers, such as in a cloud computing or data center implementation. The messaging server system 108 or the product catalog service system 602 store or generate information that are requested or received by the client device 102 as described further below.

As illustrated, the client device 102, which hosts a number of applications including the messaging client application 104 as described before in FIG. 1, is communicatively coupled to other instances of the messaging client application 104 (e.g., on another client device 102), and the messaging server system 108 via the network 106. The messaging server system 108 includes the product catalog system 124 as described above in FIG. 1.

In an example embodiment, the client device 102 may select or access an augmented reality (AR) experience, such as an augmented reality (AR) content generator, and the like for a given product, by using the product catalog system 124. The product catalog system 124 may access a product catalog service system 602, which provides product information/metadata in one or more databases 620 regarding respective products.

The product catalog system 124 can receive at least an indicator of a selected AR experience (e.g., a product AR experience ID as described further herein) from the client device 102, and perform a lookup, search, or select operation on the product table 316 to retrieve the product metadata from the database 120. In an example embodiment, such product metadata includes a product identifier (ID). The product catalog system 124 provides the client device 102 with the aforementioned product metadata, which enables the client device 102 to access or initiate the selected AR experience for display on the client device 102.

For purposes of populating the product table 316, the product catalog system 124 can communicate with the product catalog service system 602. In an example, the product catalog system 124 can send a request message to a respective server for obtaining metadata related to a given physical item. The request message may include, for example, the product ID. In an embodiment, such a server is, as further illustrated in the network environment 600, the product catalog service system 602. The product catalog service system 602, in an embodiment, is implemented as an electronic-based service (e.g., web service) that can be accessed by a given client electronic device, such as the client device 102, based on a request message including the product ID in a particular message protocol. In response to the request message, the product catalog service system 602 can perform a search or database query, based on the included product ID in the request message, for information or metadata related to the physical item.

In response to the request message, the product catalog service system 602 can provide a response message to the product catalog system 124, which includes, in an example embodiment, the information from the database 620 in response to the request. The product catalog system 124 can store the received information into the database 120. Based at least on information retrieved from the database 120 related to the product, the client device 102 can provide for display (e.g., rendering on a UI of the messaging client application 104) an AR experience for the product.

In an embodiment, the client device 102 as described above in FIG. 6 may be, for example, a portable computing device such as a laptop computer, a smartphone, a peripheral device (e.g., a digital camera), a tablet device, a wearable device such as a watch, a band, a headset, and the like, or any other appropriate device. Each of the aforementioned device may also support touchscreen gestures (e.g., through use of a touchscreen) or non-touch gestures (e.g., through use of a gyroscope or motion sensor). In one or more implementations, the client device 102 may support touchscreen-like gestures, such as in a virtual reality or augmented reality environment. In FIG. 6, by way of example, the client device 102 is depicted as a mobile electronic device with a touchscreen. In one or more implementations, the client device 102 may be, or may include all or part of, a machine as described further below. The client device 102 may include components that perform operations for providing AR experiences of physical items (e.g., products) as described in further detail below.

Figure 7:
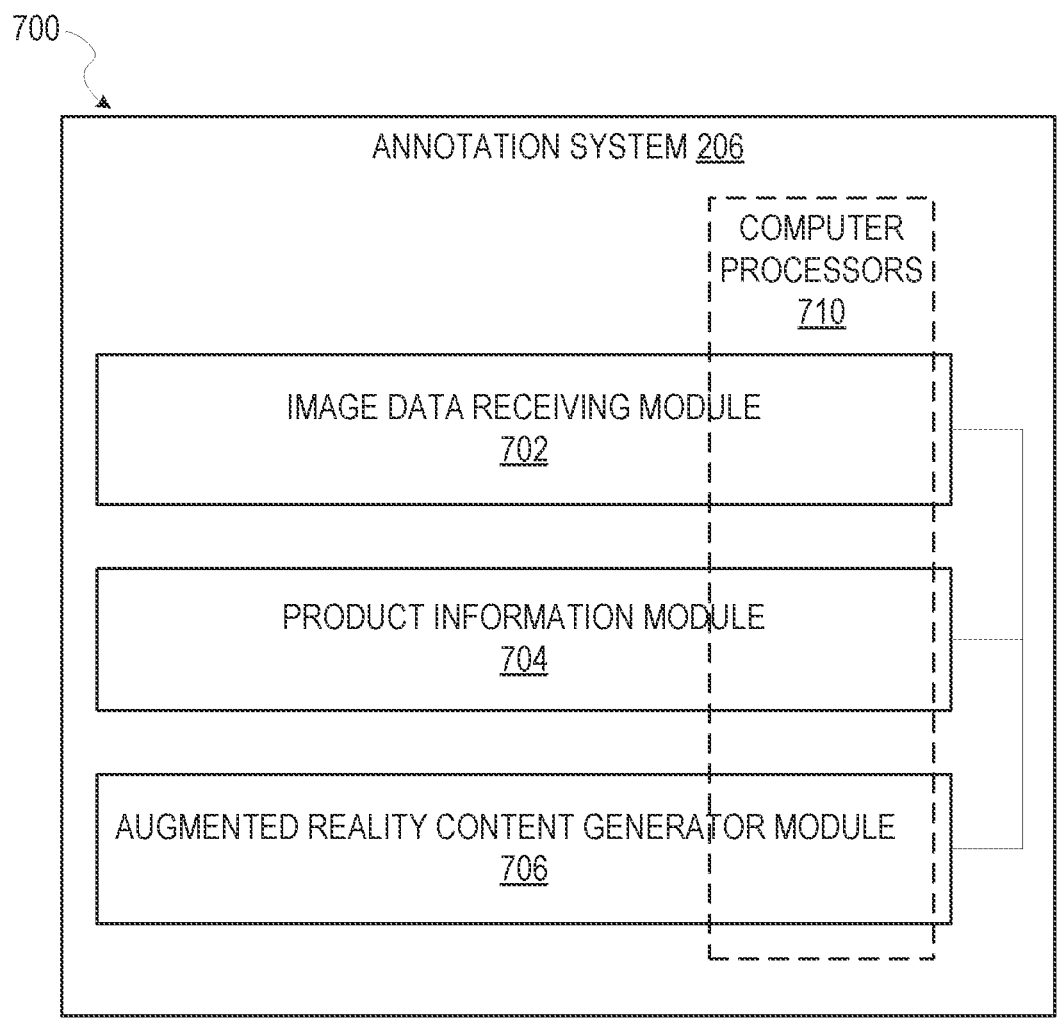
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image data receiving module 702, a product information module 704, and an augmented reality content generator module 706. The various modules of the annotation system 206 are configured to communicate with each other (e.g., via a bus, shared memory, or a switch). Any one or more of these modules may be implemented using one or more computer processors 710 (e.g., by configuring such one or more computer processors to perform functions described for that module) and hence may include one or more of the computer processors 710 (e.g., a set of processors provided by the client device 102).

Any one or more of the modules described may be implemented using hardware alone (e.g., one or more of the computer processors 710 of a machine (e.g., machine 1700) or a combination of hardware and software. For example, any described module of the annotation system 206 may physically include an arrangement of one or more of the computer processors 710 (e.g., a subset of or among the one or more computer processors of the machine (e.g., machine 1700) configured to perform the operations described herein for that module. As another example, any module of the annotation system 206 may include software, hardware, or both, that configure an arrangement of one or more computer processors 710 (e.g., among the one or more computer processors of the machine (e.g., machine 1700) to perform the operations described herein for that module. Accordingly, different modules of the annotation system 206 may include and configure different arrangements of such computer processors 710 or a single arrangement of such computer processors 710 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images captured by a client device 102. For example, an image is a photograph captured by an optical sensor (e.g., camera) of the client device 102. An image includes one or more real-world features, such a user's face, or a physical object(s) detected in the image. In some embodiments, an image includes metadata describing the image.

Based at least in part on one of the aforementioned classifications, the product information module 704 can perform operations (e.g., a process) for determining product metadata for a particular product. Further, the product information module 704 may receive product metadata from the product catalog system 124 as described herein.

The augmented reality content generator module 706 cause display of selectable graphical items that, in an embodiment, are presented in a carousel arrangement (e.g., a carousel interface). By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, respective AR experiences corresponding to different AR content generators can be organized into respective groups for including on the carousel arrangement thereby enabling rotating through media overlays by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

The augmented reality content generator module 706 utilizes different object or facial detection processes to detect objects or a face in the image. In an example, imaging processing algorithms and recognition techniques may be used to detect the user's face in the image. Based on the selected AR content generator, the augmented reality content generator module 706 can generate and render an AR experience based on the selected AR content generator from the carousel interface for display on a given client device (e.g., the client device 102). In an embodiment, information from the product information module 704 (e.g., a product ID, and the like) is used by the augmented reality content generator module 706 to render such AR content.

The augmented reality content generator module 706 performs rendering of content for display by the messaging client application 104 based on data provided by at least one of the aforementioned modules. For example, the augmented reality content generator module 706 performs various operations based on algorithms or techniques that correspond to animations or providing visual or auditory effects, based on the product information, to the received image data, which is described further herein.

The augmented reality content generator module 706 performs rendering of the message for display by the messaging client application 104 based on data provided by at least one of the aforementioned modules. In an example, the augmented reality content generator module 706 utilizes a graphical processing pipeline to perform graphical operations to render the message for display. The augmented reality content generator module 706 implements, in an example, an extensible rendering engine which supports multiple image processing operations corresponding to respective media overlays.

In some implementations, the augmented reality content generator module 706 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular media overlay that is applied to an input frame (e.g., image or video). A shader can be implemented as code running on a specialized processing unit, also referred to as a shader unit or shader processor, usually executing several computing threads, programmed to generate appropriate levels of color or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, or pixel shading is performed at a particular per-pixel rate. In this manner, a given client device (e.g., the client device 102) operates the graphical processing pipeline to convert information corresponding to objects into a bitmap that can be displayed by the electronic device.

Figure 8:
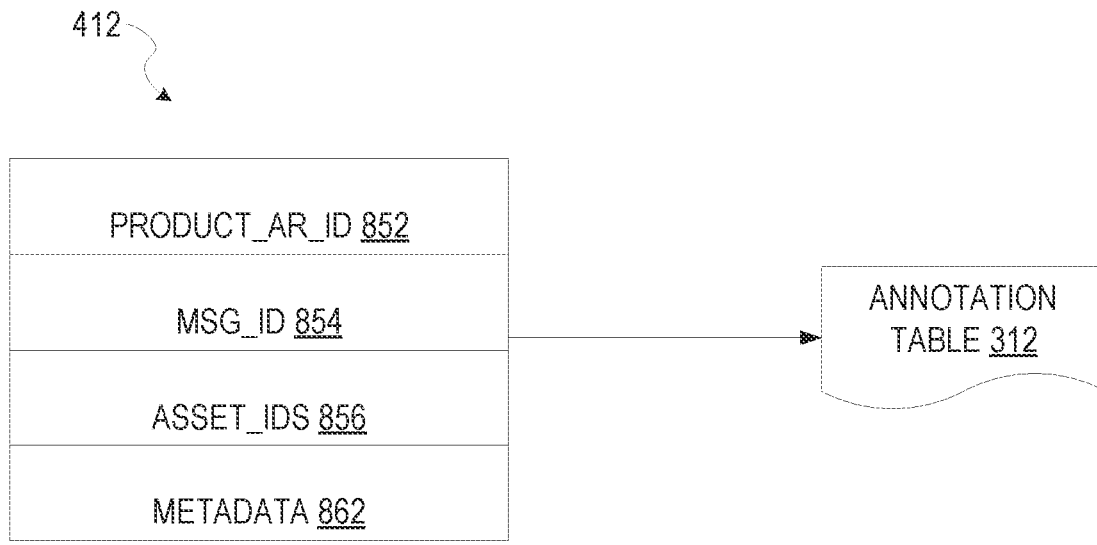
FIG. 8 is a schematic diagram illustrating a structure of the message annotations, as described in FIG. 4, including additional information corresponding to product metadata for a physical item (e.g., product), according to some embodiments.

FIG. 8 is a schematic diagram illustrating a structure of the message annotations 412, as described in FIG. 4, including additional information corresponding to an augmented reality experience for a product, according to some embodiments.

In an embodiment, the content of a particular message 400 including the additional data shown in FIG. 8 is used to populate the message table 314 stored within the database 120 for a given message, which is then accessible by the product catalog system 124, or the messaging client application 104. As illustrated in an example embodiment, message annotations 412 includes the following components corresponding to data for a message:

A product augmented reality experience identifier 852: identifier of an augmented reality experience (e.g., augmented reality content generator, animation or effect, including an effect, LENSES, filter, image modifier, and the like) utilized in the message message identifier 854: identifier of the message asset identifiers 856: a set of identifiers for assets in the message. For example, respective asset identifiers can be included for a number of assets that is determined by the particular AR content generator. In an embodiment, such assets are created by the AR content generator on the sender side, uploaded to the messaging server application 114, and utilized by the AR content generator on the receiver side in order to recreate the message.

metadata 862 corresponding to additional metadata

Figure 9:
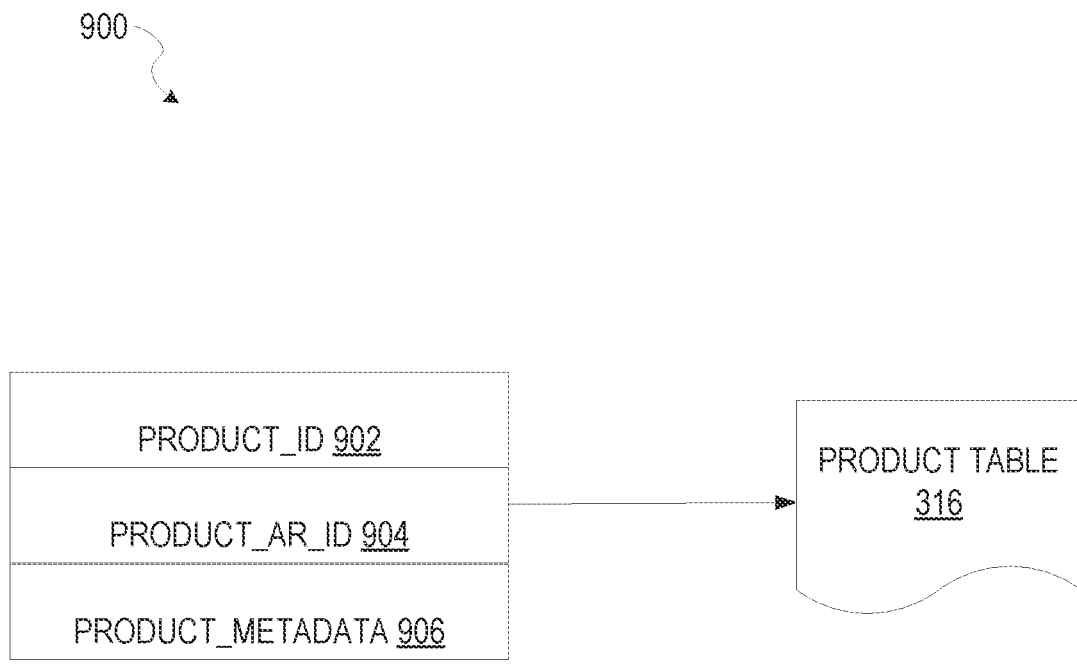
FIG. 9 is a schematic diagram illustrating a structure of product metadata stored in the product table, as described in FIG. 3, corresponding to information for a physical item (e.g., product), according to some embodiments.

FIG. 9 is a schematic diagram illustrating a structure of product metadata 900 stored in the product table 316, as described in FIG. 3, corresponding to information for a physical item (e.g., product), according to some embodiments.

In an embodiment, the data shown in FIG. 9 is used to populate the product table 316 stored within the database 120, which is then accessible by the product catalog system 124, or the messaging client application 104. As illustrated in an example embodiment, the product metadata 900 includes the following components:

A product identifier 902: identifier of a product (e.g., model number, part number, a unique serial number, etc.) extracted from the physical identification identifier from the image data A product augmented reality experience identifier 904: identifier of an augmented reality experience (e.g., augmented reality content generator, animation or effect, including an effect, LENSES, filter, image modifier, and the like) utilized in the message, which can be utilized to compare against the product augmented reality experience identifier 852 discussed in FIG. 8 product metadata 906: information related to the product corresponding to the product identifier 902

In some embodiments, the subject technology provides an application or tool for developing (e.g., creating and publishing) augmented reality experiences (e.g., AR content generators). The following discussion in FIG. 10 and FIG. 11 relates to aspects of such an application, which are related to providing AR experiences for products as discussed further herein.

Figure 10:
FIG. 10 illustrates an example interface for displaying, on a client device, information for a project, according to some embodiments.

FIG. 10 illustrates an example interface 1000 for displaying, on a client device, information for a project. As illustrated in the interface 1000, a graphical element 1010 is included to provide an option for indicating that the project corresponds to an augmented reality content generator (e.g., that provides an AR experience) for a product (e.g., "shopping" AR experience). In an example, the interface 1000 is displayed when creating a new project in an application or tool for developing augmented reality experiences.

Figure 11:
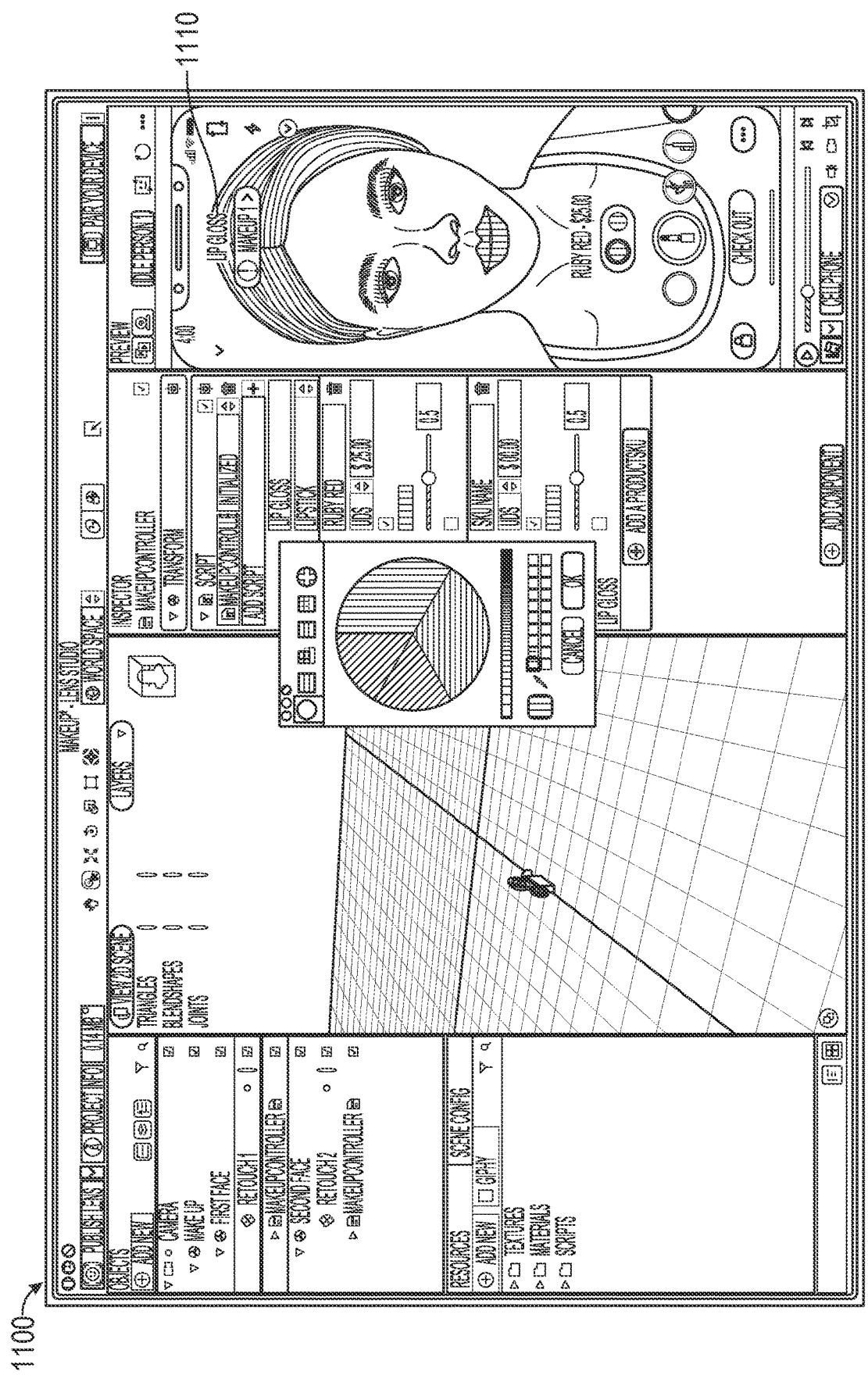
FIG. 11 illustrates an example interface of an application for developing an augmented reality content generator (e.g., for providing an AR experience) based on a project, according to some embodiments.

FIG. 11 illustrates an example interface 1100 of an application for developing an augmented reality content generator (e.g., for providing an AR experience) based on a project. As illustrated in the interface 1100, various graphical elements are included to modify and configure various aspects of the AR content generator. As further shown, a preview of the AR content generator is shown in a set of graphical elements 1110, which may advantageously provide a simulated rendering of the AR content generator when provided for display in a given client device (e.g., the client device 102). In an embodiment, the application may be a program that enables editing of a given augmented reality content generated, including modification of various properties and interactive characteristics, including AR content, of a given augmented reality content generator. Further, the application may enable editing of product metadata (e.g., a product ID, and the like) for a product associated with the augmented reality content generator.

Figure 12:
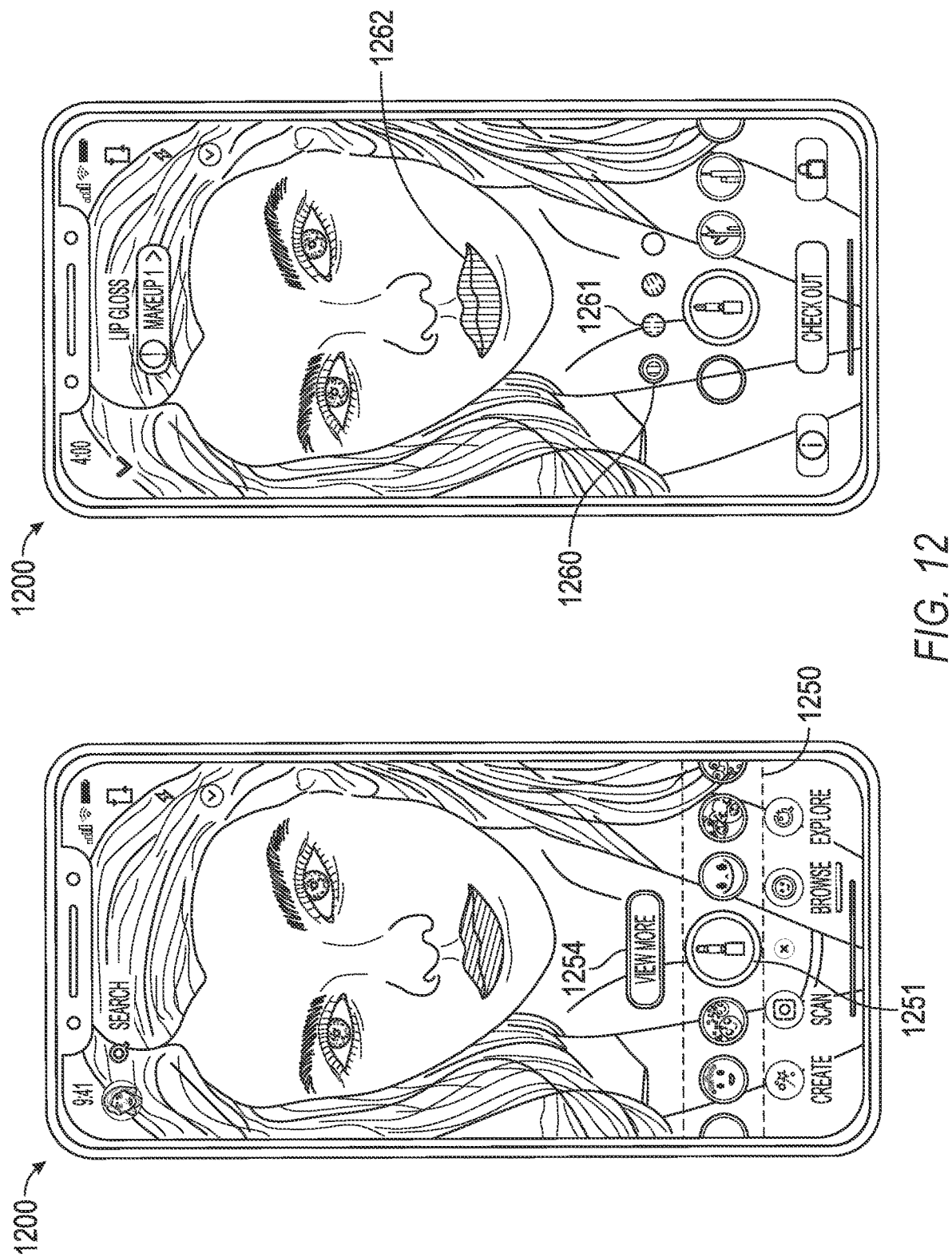
FIG. 12 illustrates example user interfaces depicting a carousel for selecting and applying an augmented reality experience to media content (e.g., an image or video), and presenting the applied augmented reality experience in the messaging client application 104 (or the messaging system).

FIG. 12 illustrates example user interfaces depicting a carousel for selecting and applying an augmented reality experience to media content (e.g., an image or video), and presenting the applied augmented reality experience in the messaging client application 104 (or the messaging system 100), according to some embodiments.

In embodiments of such user interfaces, selectable graphical items 1250 may be presented in a carousel arrangement in which a portion or subset of the selectable graphical items 1250 are visible on a display screen of a given computing device (e.g., the client device 102). By way of example, the user can utilize various inputs to rotate the selectable graphical items onto and off of the display screen in manner corresponding to a carousel providing a cyclic view of the graphical items. The carousel arrangement as provided in the user interfaces therefore allow multiple graphical items to occupy a particular graphical area on the display screen.

As described herein, augmented reality content generators, as represented by respective selectable graphical items, can be included on the carousel arrangement thereby enabling rotating through various augmented reality content generators. Further, augmented reality content generators can be selected for inclusion based on various signals including, for example, time, date, geolocation, metadata associated with the media content, and the like. In the carousel arrangement of the user interface examples of FIG. 12, respective augmented reality content generators are selected from available augmented reality content generators provided by the subject system. In FIG. 12, the selectable graphical items included in the carousel interface can correspond to respective AR experiences for different products.

In the following discussion, the selectable graphical items correspond to respective augmented reality content generators that are applied to media content (e.g., image or video data). As illustrated in user interface 1200, selectable graphical items 1250, corresponding to a carousel arrangement, includes a selectable graphical item 1251 in the display screen of an electronic device (e.g., the client device 102). For example, a swipe gesture is received via a touch screen of the client device 102, and in response to receiving the swipe gesture, navigation through the selectable graphical items is enabled to facilitate selection of a particular augmented reality (AR) content generator.

The selectable graphical item 1251 is selected via a touch input (e.g., tap, or through a touch release at the end of the gesture) by the user. In this example, the selectable graphical item 1251 corresponds to a particular augmented reality content generator (e.g., providing an augmented reality experience) corresponding to a product (e.g., beauty/makeup product corresponding to lipstick as shown), which including graphical effects or transformations, and the like, that are provided on the display screen of the client device 102. In an embodiment, product metadata associated with the selected AR content generator can specify an object (e.g., a portion of the user's face corresponding to the lips in the following examples) for rendering the AR content. The interface 1200 also includes a selectable graphical item 1254, which enables upon selection a display of additional interfaces and menus with further products, which is discussed in more detail in FIG. 14 below.

In a second example of FIG. 12, upon selection of a selectable graphical item 1260 (e.g., corresponding to a particular color of the product, which is a different color of the lipstick as shown), a different augmented reality experience is rendered for display in which the different color of the lipstick is provided as an augmented reality content 1262 on the portion of the user's face (e.g., lips) in the media content (e.g., image or video data). To display another color of the lipstick, the user can select a selectable graphical item 1261 that renders for display a second different color of the lipstick in the form of the augmented reality content 1262 on the portion of the user's face (e.g., lips). In this manner, the interface 1200 enables the user to select various AR experiences for the product (e.g., different lipstick colors) that render for display an aspect of the product without requiring the user to physically try on or utilize the product on the user's actual (physical) face.

Figure 13:
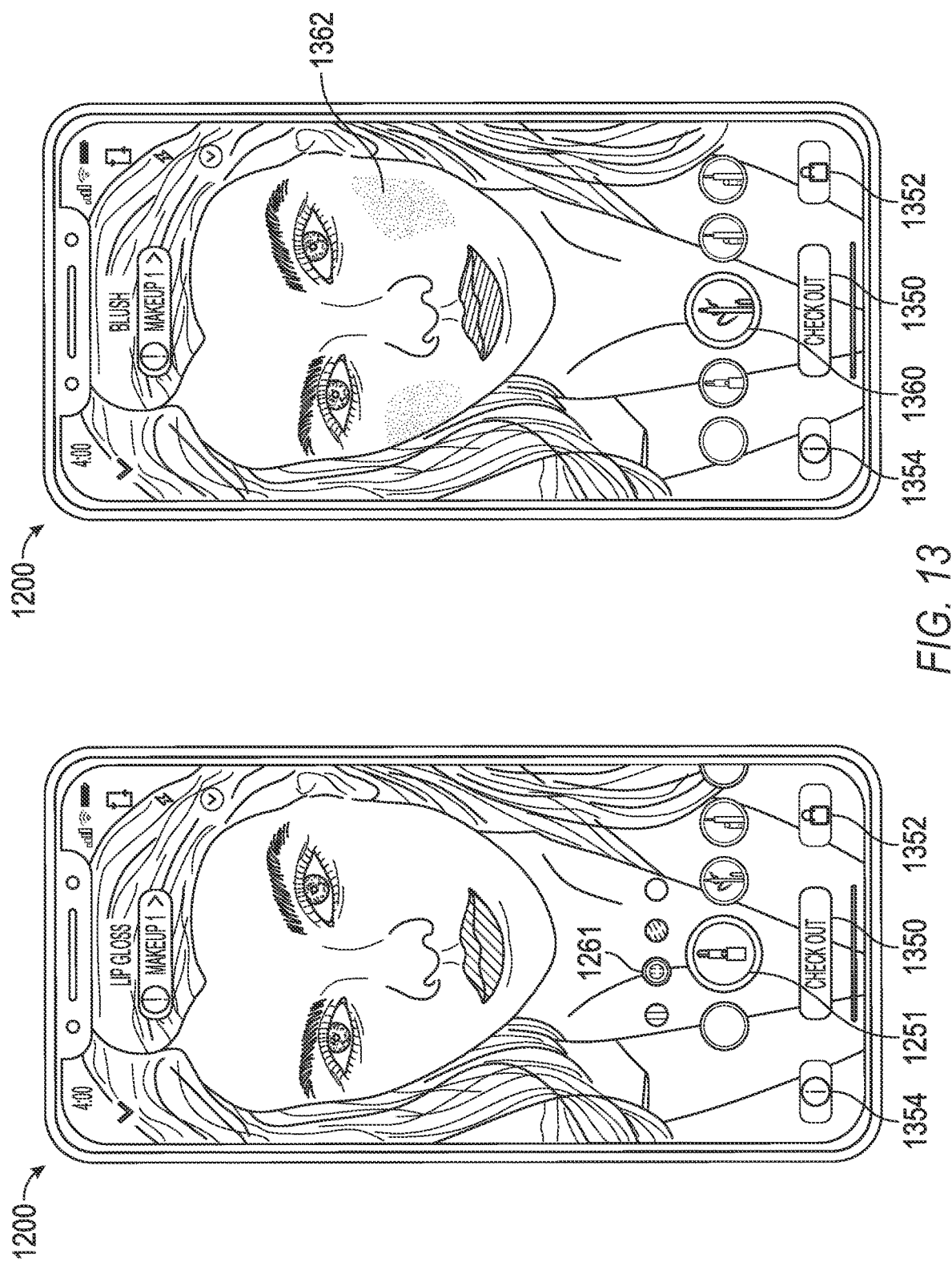
FIG. 13 illustrates example user interfaces which display a rendering of an augmented reality experience to media content (e.g., an image or video), and presenting the applied augmented reality experience in the messaging client application 104 (or the messaging system), according to some example embodiments.

FIG. 13 illustrates example user interfaces which display a rendering of an augmented reality experience to media content (e.g., an image or video), and presenting the applied augmented reality experience in the messaging client application 104 (or the messaging system 100), according to some embodiments. FIG. 13 continues the discussion in connection with the examples described above for the interface 1200 of FIG. 12.

As shown in a first example, after the user has selected the selectable graphical item 1261 (e.g., a selected color for the product), an AR experience provided by an AR content generator (e.g., corresponding to the product represented by the selectable graphical item 1251). In an embodiment, the selectable graphical item 1261 is an option provided the AR content generator for the product for rendering different AR content onto a portion of the user's face.

As further shown, a selectable graphical item 1354 is provided for which upon being selected causes a display of additional information for the product. A selectable graphical item 1352 is also provided to cause a display of a set of products in a virtual shopping cart of the user, which the user may intend to purchase. As also illustrated, a selectable graphical item 1350 is provided that upon being selected initiates a process for purchasing the product (or a set of products that the user may have in a virtual shopping cart).

As shown in a second example, the user has selected a selectable graphical element 1360 corresponding to a different AR content generator associated with a different product (e.g., facial makeup). In this example, the AR content generator has provided AR content 1362 that is applied to different portions of the representation of the user's face (e.g., left and right cheeks) to provide an AR experience associated with the different product. Product metadata associated with the AR content generator can include information that determines that the AR content. 1362 is to be rendered on the left and right cheeks of the representation of the user's face.

Although not explicitly shown, it is appreciated that another selectable graphical element corresponding to yet another product can be selected, which initiates an AR experience associated with an AR content generator for that selected product. The subject technology therefore provides the user with different AR experiences depending on a particular AR content generator that is selected in the carousel interface.

Figure 14:
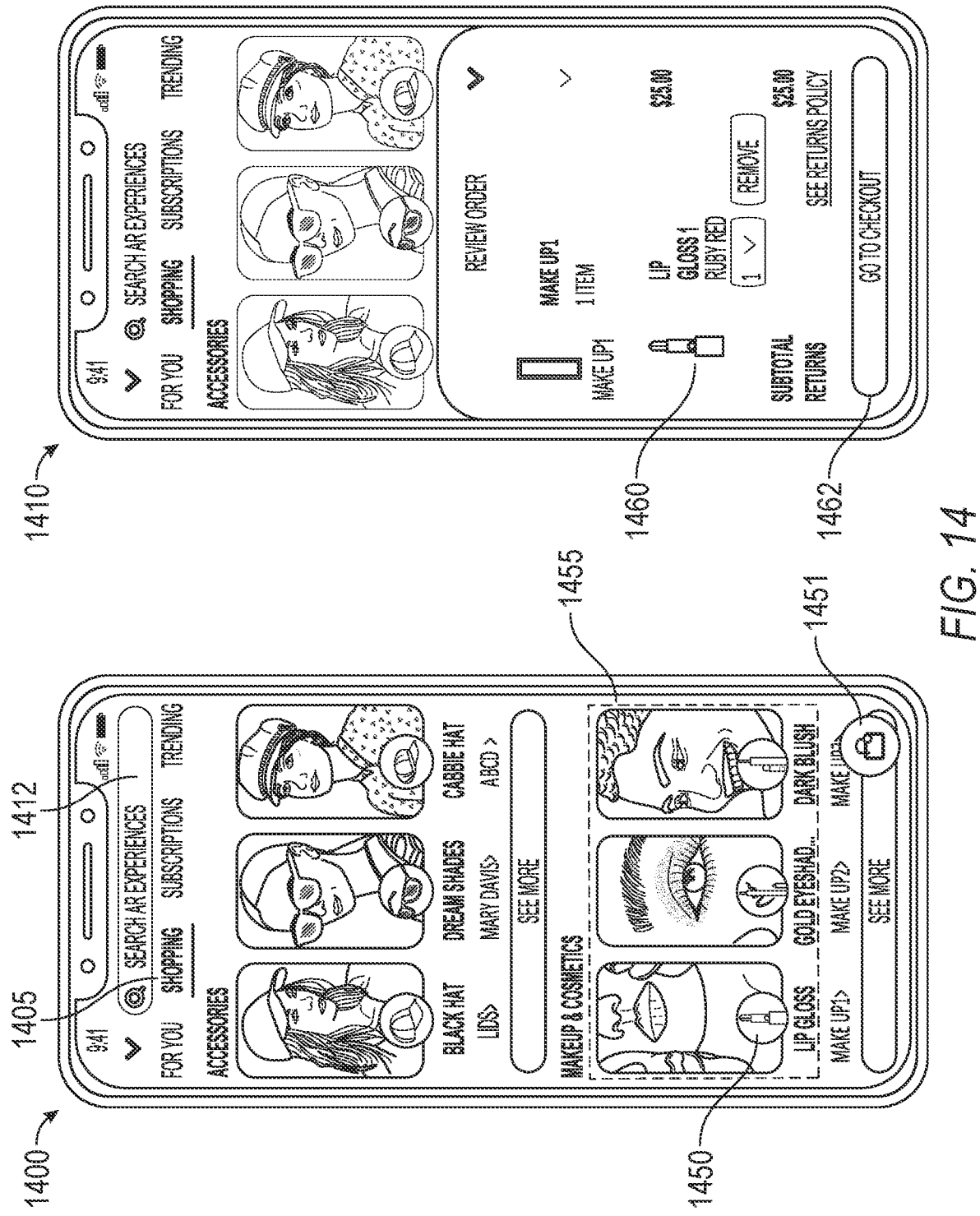
FIG. 14 illustrates example user interfaces for browsing through a set of AR experiences that are provided by the subject system (e.g., AR content generators provided in the carousel interface discussed above), according to certain example embodiments.

FIG. 14 illustrates example user interfaces for browsing through a set of AR experiences that are provided by the subject system (e.g., AR content generators provided in the carousel interface discussed above). In an embodiment, the product table 316 can include product metadata corresponding to respective products, which can be utilized to populate the information shown in an interface 1400.

As shown in the interface 1400, a tabbed menu can include an option 1405, which when selected, causes the interface 1400 to display an arrangement of various products based on the product metadata from the product table 316. Such products, as discussed before, can be based on information provided by the product catalog service system 602.

The interface 1400 also includes a search bar 1412, which enables search queries to be inputted that then performed on the product table 316. In an embodiment, the results of a given search query can be provided in the interface 1400 for the user to view.

In this example, a graphical element 1450 corresponds to the product (e.g., lipstick) discussed in connection with FIG. 12 and FIG. 13 above. As further shown, a graphical element 1451 represents a virtual shopping cart, which is used to initiate a process to purchase products provided in the interface 1400.

In an embodiment, a set of products shown in a graphical area 1455 are utilized to select corresponding AR content generators for inclusion in the carousel interface as discussed before in FIG. 12 and FIG. 13. Further, upon selection of the graphical element 1450, the carousel interface shown in the examples of FIG. 12 may be provided for display on the client device 102.

Upon selection of the graphical element 1451, various graphical elements and information (e.g., price, quantity, return policy, product description, vendor, etc.), including a graphical element 1460 corresponding to a representation of the same product associated with the graphical element 1450, are shown in an interface 1410. The user can select a graphical element 1462 to initiate a process to purchase the product represented by the graphical element 1460 (e.g., lipstick).

Figure 15:
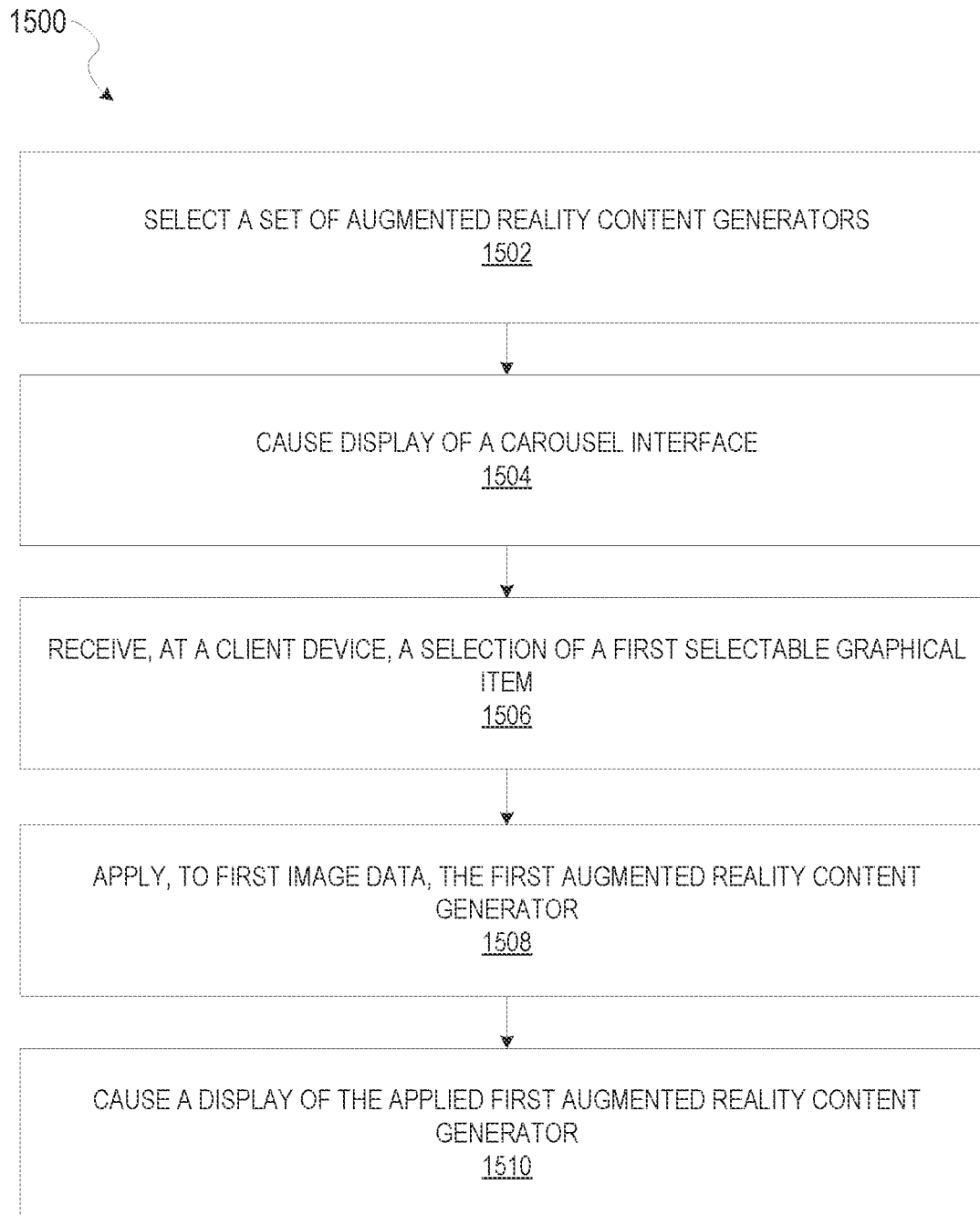
FIG. 15 is a flowchart illustrating a method to provide a carousel interface for selecting a particular augmented reality content generator, according to certain example embodiments.

FIG. 15 is a flowchart illustrating a method 1500 to provide a carousel interface for selecting a particular augmented reality content generator, according to certain example embodiments. The method 1500 may be embodied in computer-readable instructions for execution by one or more computer processors such that the operations of the method 1500 may be performed in part or in whole by the messaging client application 104, particularly with respect to respective components of the annotation system 206 described above in FIG. 7; accordingly, the method 1500 is described below by way of example with reference thereto. However, it shall be appreciated that at least some of the operations of the method 1500 may be deployed on various other hardware configurations and the method 1500 is not intended to be limited to the messaging client application 104.

At operation 1502, the augmented reality content generator module 706 selects a set of augmented reality content generators from a plurality of available augmented reality content generators. In an example, the selected set of augmented reality content generators comprising at least one augmented reality content generator for providing augmented reality content based on a product. In an example, the product corresponds to a beauty or make-up product.

At operation 1504, the augmented reality content generator module 706 causes display of a carousel interface including selectable graphical items (e.g., the user interface 1200 as discussed before). Each selectable graphical item of the selectable graphical items corresponds to a respective augmented reality content generator of the set of augmented reality content generators.

At operation 1506, the augmented reality content generator module 706 receives, at a client device (e.g., the client device 102), a selection of a first selectable graphical item from the selectable graphical items. In an embodiment, the first selectable graphical item is a first augmented reality content generator for applying first augmented reality content based on the product. In an example, the first augmented reality content generator was created by an application that creates augmented reality experiences in a messaging system as described before in FIG. 10 and FIG. 11.

At operation 1508, the augmented reality content generator module 706 applies, to first image data, the first augmented reality content generator corresponding to the selected first selectable graphical item, the first image data being captured with a camera. In an example, the selected augmented reality content generator includes logic to enable processing the first image data based on the product.

For applying the first augmented reality content generator, the image data receiving module 702 can receive image data captured by an optical sensor (e.g., camera) of the client device 102.

In an embodiment, applying the first augmented reality content generator to the first image data includes: based on product metadata, identifying a portion of the first image data to apply the first augmented reality content generator, and applying the first augmented reality content generator to the portion of the first image data. The portion of the first image data may include a portion of a representation of a face, or a particular facial feature of the face. As discussed before, product metadata corresponding to the product is provided by a product catalog service in an embodiment.

In an embodiment, applying the first augmented reality content generator to the first image data generates second image data. Rendering the second image data therefore can be accomplished by applying the first augmented reality content generator to the first image data in an example.

At operation 1510, the augmented reality content generator module 706 causes a display of second image data, the second image data include including the applied first augmented reality content generator to the first image data. In an embodiment, the first augmented reality content and the second image data are rendered for display on the display screen of the client device 102. The display of the second image data enables a user to view a representation of the product applied to a portion of the user's face in an example.

Figure 16:
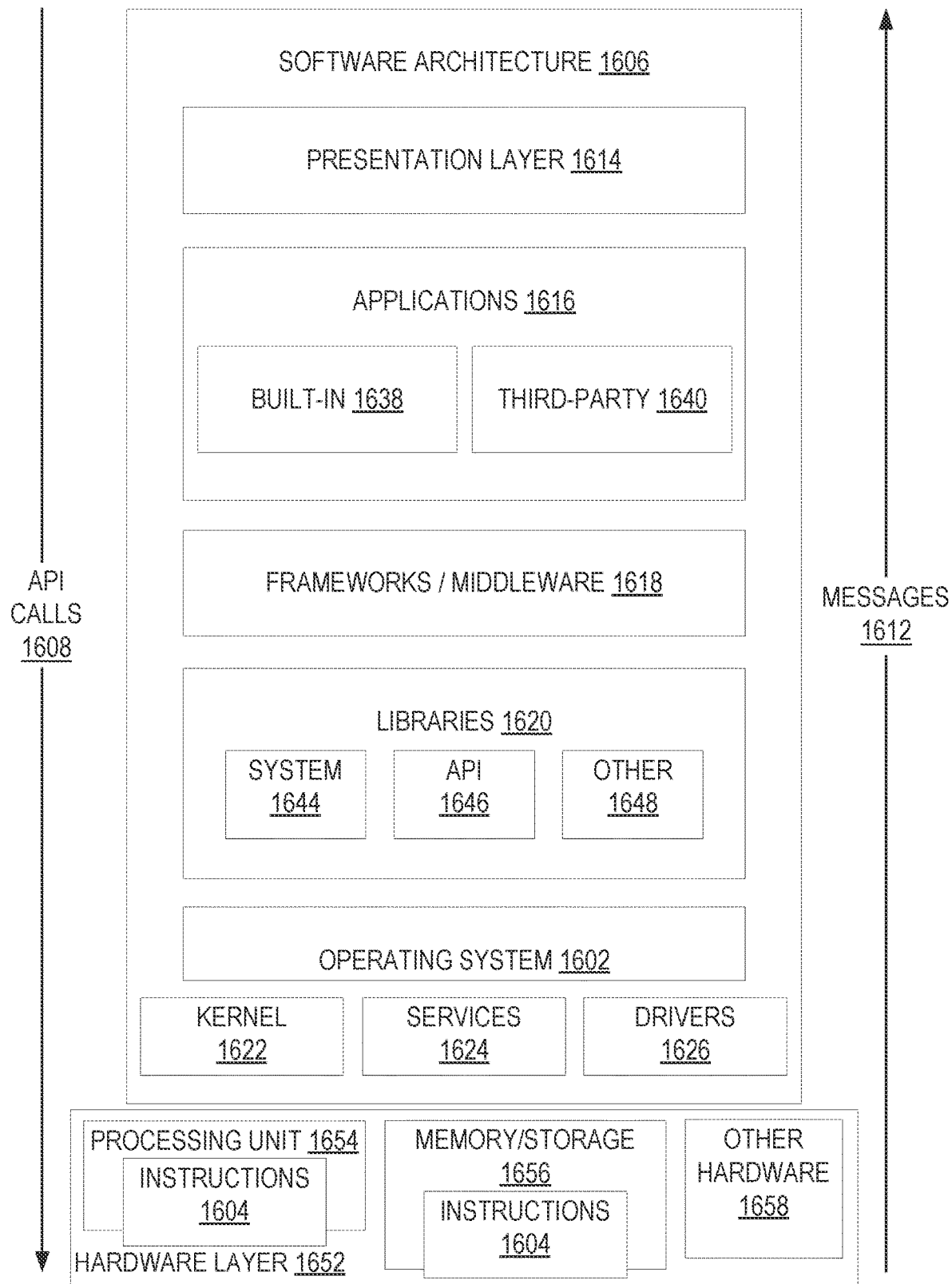
FIG. 16 is block diagram showing a software architecture within which the present disclosure may be implemented, in accordance with some example embodiments.

FIG. 16 is a block diagram illustrating an example software architecture 1606, which may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as machine 1700 of FIG. 17 that includes, among other things, processors 1704, memory 1714, and (input/output) I/O components 1718. A representative hardware layer 1652 is illustrated and can represent, for example, the machine 1700 of FIG. 17. The representative hardware layer 1652 includes a processing unit 1654 having associated executable instructions 1604. Executable instructions 1604 represent the executable instructions of the software architecture 1606, including implementation of the methods, components, and so forth described herein. The hardware layer 1652 also includes memory or storage modules memory/storage 1656, which also have executable instructions 1604. The hardware layer 1652 may also comprise other hardware 1658.

In the example architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 or other components within the layers may invoke API calls 1608 through the software stack and receive a response as in messages 1612 to the API calls 1608. The layers illustrated are representative in nature and not all software architectures have all layers. For example, some mobile or special purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 or other components or layers. The libraries 1620 provide functionality that allows other software components to perform tasks in an easier fashion than to interface directly with the underlying operating system 1602 functionality (e.g., kernel 1622, services 1624 or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 (also sometimes referred to as middleware) provide a higher-level common infrastructure that may be used by the applications 1616 or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be used by the applications 1616 or other software components/modules, some of which may be specific to a particular operating system 1602 or platform.

The applications 1616 include built-in applications 1638 or third-party applications 1640. Examples of representative built-in applications 1638 may include, but are not limited to, a contacts application, a browser application, a book reader application, a location application, a media application, a messaging application, or a game application. Third-party applications 1640 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 1640 may invoke the API calls 1608 provided by the mobile operating system (such as operating system 1602) to facilitate functionality described herein.

The applications 1616 may use built in operating system functions (e.g., kernel 1622, services 1624 or drivers 1626), libraries 1620, and frameworks/middleware 1618 to create user interfaces to interact with users of the system. Alternatively, or additionally, in some systems interactions with a user may occur through a presentation layer, such as presentation layer 1614. In these systems, the application/component 'logic' can be separated from the aspects of the application/component that interact with a user.

Figure 17:
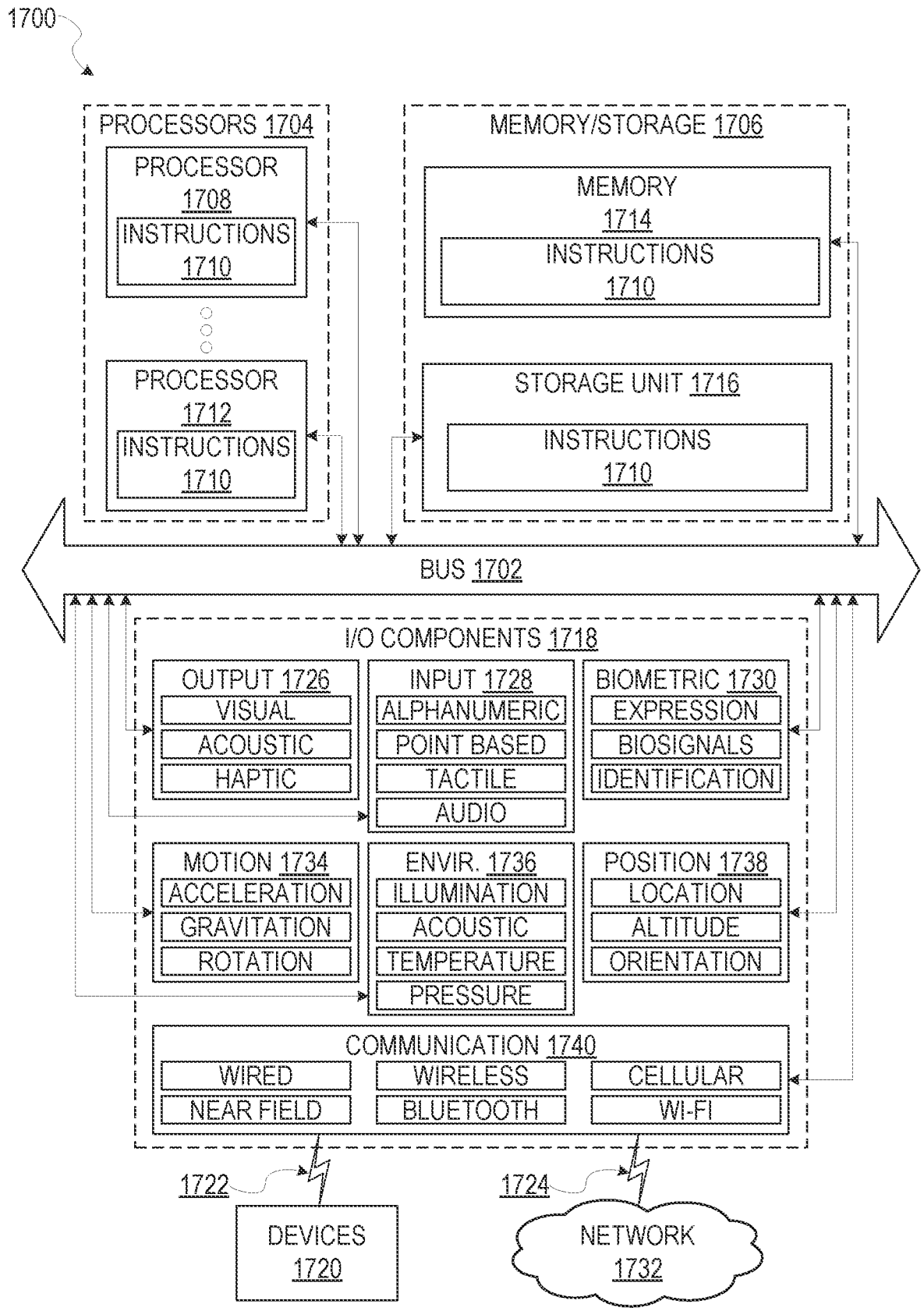
FIG. 17 is a diagrammatic representation of a machine, in the form of a computer system within which a set of instructions may be executed for causing the machine to perform any one or more of the methodologies discussed, in accordance with some example embodiments.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term 'machine' shall also be taken to include a collection of machines that individually or jointly execute the instructions 1710 to perform any one or more of the methodologies discussed herein.

The machine 1700 may include processors 1704, including processor 1708 to processor 1712, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of processors 1704 are examples of machine-readable media.

The I/O components 1718 may include a wide variety of components to receive input, provide output, produce output, transmit information, exchange information, capture measurements, and so on. The specific I/O components 1718 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 1718 may include biometric components 1730, motion components 1734, environmental components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environmental components 1736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via coupling 1724 and coupling 1722, respectively. For example, the communication components 1740 may include a network interface component or other suitable device to interface with the network 1732. In further examples, communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices or media (e.g., a centralized or distributed database, or associated caches and servers) that store executable instructions, routines or data. The term shall accordingly be taken to include, but not be limited to, solid-state memories, and optical and magnetic media, including memory internal or external to processors. Specific examples of machine-storage media, computer-storage media or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.' 'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices or media (e.g., a centralized or distributed database, or associated caches and servers) that store executable instructions, routines or data. The term shall accordingly be taken to include, but not be limited to, solid-state memories, and optical and magnetic media, including memory internal or external to processors. Specific examples of machine-storage media, computer-storage media or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion)

as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
    selecting a set of augmented reality content generators from a plurality of available augmented reality content generators, the selected set of augmented reality content generators comprising at least one augmented reality content generator for providing augmented reality content based on a product, wherein selecting the set of augmented reality content generators comprises:

receiving, by a product catalog system, an indicator of a selected augmented reality content generator, and performing, by the product catalog system, a lookup operation on a product table to retrieve product metadata, the product metadata comprising a product identifier, a product augmented reality experience identifier, and information related to a particular product corresponding to the product identifier, wherein the product metadata corresponding to the product is provided by a product catalog service system, the product catalog system and the product catalog service system are different systems, and further comprising:

sending, by the product catalog system, a request message to the product catalog service system for obtaining metadata related to a respective physical item, the request message including the product identifier, performing, by the product catalog service system, a query based on the product identifier in the request message for information related to the respective physical item, in response to the request message, providing, by the product catalog service system, a response message to the product catalog system, the response message including the information related to the respective physical item, the information related to the respective physical item comprising particular information indicating a price, a product description, a return policy, and vendor, and storing, by the product catalog system, the information related to the respective physical item into the product table;

causing display of a particular interface, the particular interface including a tabbed menu, the tabbed menu including a selectable graphical element corresponding to a particular option to display an arrangement of a particular set of products based on the product metadata from the product table;

receiving a selection of the particular option from the tabbed menu;

causing, in response to receiving the selection of the particular option, display, in the particular interface, of the arrangement of the particular set of products based on the product metadata from the product table;

selecting, using the particular set of products displayed in the particular interface, a set of corresponding augmented reality content generators for inclusion in a carousel interface;

causing display of the carousel interface comprising a plurality of selectable graphical items, each selectable graphical item corresponding to a respective augmented reality content generator of the selected set of corresponding augmented reality content generators;

receiving, at a client device, a selection of a first selectable graphical item from the plurality of selectable graphical items, the first selectable graphical item comprising a first augmented reality content generator for applying first augmented reality content based on the product;

applying, to first image data, the first augmented reality content generator corresponding to the selected first selectable graphical item, the first image data being captured with a camera; and causing a display of second image data, the second image data including the applied first augmented reality content generator to the first image data.

2. The method of claim 1, further comprising:

receiving a swipe gesture via a touch screen of the client device; and in response to receiving the swipe gesture, causing navigation through the plurality of selectable graphical items.

3. The method of claim 1, wherein applying the first augmented reality content generator to the first image data generates the second image data.

4. The method of claim 1, wherein applying the first augmented reality content generator to the first image data comprises:

based on product metadata, identifying a portion of the first image data to apply the first augmented reality content generator; and applying the first augmented reality content generator to the portion of the first image data.

5. The method of claim 4, wherein the portion of the first image data comprises a portion of a representation of a face, or a particular facial feature of the face.

6. The method of claim 1, wherein causing the display of the second image data comprises:

rendering the first augmented reality content and the second image data.

7. The method of claim 1, wherein the first augmented reality content generator was created by an application that creates augmented reality experiences in a messaging system.

8. The method of claim 1, wherein the product corresponds to a beauty or make-up product.

9. The method of claim 8, wherein the display of the second image data enables a user to view a representation of the product applied to a portion of the user's face.

10. The method of claim 1, wherein causing display of the carousel interface further comprises:

causing display of a second plurality of second selectable graphical items, each second selectable graphical item corresponding to a particular augmented reality content generator of a second set of augmented reality content generators, the display of the second plurality of second selectable graphical items being positioned above the display of the plurality of selectable graphical items;

receiving, at the client device, a selection of a particular selectable graphical item from the second plurality of second selectable graphical items, the particular selectable graphical item comprising a first particular augmented reality content generator for applying particular augmented reality content based on a second product, the second product being different than the product; and applying, to the second image data, the first particular augmented reality content generator corresponding to the selected particular selectable graphical item.

11. The method of claim 1, further comprising:

causing display of a second plurality of selectable graphical items, each of the second plurality of selectable graphical items comprising a different option for the product, the second plurality of selectable graphical items being positioned in a horizontal arrangement above the carousel interface.

12. A system comprising:

a processor; and a memory including instructions that, when executed by the processor, cause the processor to perform operations comprising:

selecting a set of augmented reality content generators from a plurality of available augmented reality content generators, the selected set of augmented reality content generators comprising at least one augmented reality content generator for providing augmented reality content based on a product, wherein selecting the set of augmented reality content generators comprises:

receiving, by a product catalog system, an indicator of a selected augmented reality content generator, and performing, by the product catalog system, a lookup operation on a product table to retrieve product metadata, the product metadata comprising a product identifier, a product augmented reality experience identifier, and information related to a particular product corresponding to the product identifier, wherein the product metadata corresponding to the product is provided by a product catalog service system, the product catalog system and the product catalog service system are different systems, and further comprising:

sending, by the product catalog system, a request message to the product catalog service system for obtaining metadata related to a respective physical item, the request message including the product identifier, performing, by the product catalog service system, a query based on the product identifier in the request message for information related to the respective physical item, in response to the request message, providing, by the product catalog service system, a response message to the product catalog system, the response message including the information related to the respective physical item, the information related to the respective physical item comprising particular information indicating a price, a product description, a return policy, and vendor, and storing, by the product catalog system, the information related to the respective physical item into the product table;

causing display of a particular interface, the particular interface including a tabbed menu, the tabbed menu including a selectable graphical element corresponding to a particular option to display an arrangement of a particular set of products based on the product metadata from the product table;

receiving a selection of the particular option from the tabbed menu;

causing, in response to receiving the selection of the particular option, display, in the particular interface, of the arrangement of the particular set of products based on the product metadata from the product table;

selecting, using the particular set of products displayed in the particular interface, a set of corresponding augmented reality content generators for inclusion in a carousel interface;

causing display of the carousel interface comprising a plurality of selectable graphical items, each selectable graphical item corresponding to a respective augmented reality content generator of the selected set of corresponding augmented reality content generators;

receiving, at a client device, a selection of a first selectable graphical item from the plurality of selectable graphical items, the first selectable graphical item comprising a first augmented reality content generator for applying first augmented reality content based on the product;

applying, to first image data, the first augmented reality content generator corresponding to the selected first selectable graphical item, the first image data being captured with a camera; and causing a display of second image data, the second image data including the applied first augmented reality content generator to the first image data.

13. The system of claim 12, wherein the memory includes further instructions, which further cause the processor to perform further operations comprising:

receiving a swipe gesture via a touch screen of the client device; and in response to receiving the swipe gesture, causing navigation through the plurality of selectable graphical items.

14. The system of claim 12, wherein applying the first augmented reality content generator to the first image data generates the second image data.

15. The system of claim 12, wherein the memory includes further instructions, which further cause the processor to perform further operations comprising:

based on product metadata, identifying a portion of the first image data to apply the first augmented reality content generator; and applying the first augmented reality content generator to the portion of the first image data.

16. The system of claim 15, wherein the portion of the first image data comprises a portion of a representation of a face, or a particular facial feature of the face.

17. The system of claim 12, wherein the memory includes further instructions, which further cause the processor to perform further operations comprising:

rendering the first augmented reality content and the second image data.

18. The system of claim 12, wherein the first augmented reality content generator was created by an application that creates augmented reality experiences in a messaging system.

19. The system of claim 12, wherein product metadata corresponding to the product is provided by a product catalog service.

20. The system of claim 12, wherein the product corresponds to a beauty or make-up product.

21. A non-transitory computer-readable medium comprising instructions, which when executed by a computing device, cause the computing device to perform operations comprising:

selecting a set of augmented reality content generators from a plurality of available augmented reality content generators, the selected set of augmented reality content generators comprising at least one augmented reality content generator for providing augmented reality content based on a product, wherein selecting the set of augmented reality content generators comprises:

receiving, by a product catalog system, an indicator of a selected augmented reality content generator, and performing, by the product catalog system, a lookup operation on a product table to retrieve product metadata, the product metadata comprising a product identifier, a product augmented reality experience identifier, and information related to a particular product corresponding to the product identifier, wherein the product metadata corresponding to the product is provided by a product catalog service system, the product catalog system and the product catalog service system are different systems, and further comprising:

sending, by the product catalog system, a request message to the product catalog service system for obtaining metadata related to a respective physical item, the request message including the product identifier, performing, by the product catalog service system, a query based on the product identifier in the request message for information related to the respective physical item, in response to the request message, providing, by the product catalog service system, a response message to the product catalog system, the response message including the information related to the respective physical item, the information related to the respective physical item comprising particular information indicating a price, a product description, a return policy, and vendor, and storing, by the product catalog system, the information related to the respective physical item into the product table;

causing display of a particular interface, the particular interface including a tabbed menu, the tabbed menu including a selectable graphical element corresponding to a particular option to display an arrangement of a particular set of products based on the product metadata from the product table;

receiving a selection of the particular option from the tabbed menu;

causing, in response to receiving the selection of the particular option, display, in the particular interface, of the arrangement of the particular set of products based on the product metadata from the product table;

selecting, using the particular set of products displayed in the particular interface, a set of corresponding augmented reality content generators for inclusion in a carousel interface;

causing display of the carousel interface comprising a plurality of selectable graphical items, each selectable graphical item corresponding to a respective augmented reality content generator of the selected set of corresponding augmented reality content generators;

receiving, at a client device, a selection of a first selectable graphical item from the plurality of selectable graphical items, the first selectable graphical item comprising a first augmented reality content generator for applying first augmented reality content based on the product;

applying, to first image data, the first augmented reality content generator corresponding to the selected first selectable graphical item, the first image data being captured with a camera; and causing a display of second image data, the second image data including the applied first augmented reality content generator to the first image data.

\* \* \* \* \*